UNITED STATES PATENT OFFICE

GERALD H. MAINS, OF WILKINSBURG, PENNSYLVANIA, ASSIGNOR TO WESTINGHOUSE ELECTRIC & MANUFACTURING COMPANY, A CORPORATION OF PENNSYLVANIA

RESIN

No Drawing. Application filed August 6, 1927. Serial No. 211,262.

This invention relates to new plastics or compositions and to the process of making the same and has particular application to the manufacture of synthetic resins.

An object of the invention is to provide synthetic resins or gummy compositions which if desired may be rendered insoluble and infusible and which are useful for the production of molded articles, insulation, varnishes, etc.

Another object of the invention is to produce a new varnish which is especially adaptable for impregnating laminated sheets that may be subsequently molded and formed into composite plates under heat and pressure.

Heretofore, synthetic resins have been produced by the reaction of furfural and meta-para cresol in the presence of a small amount of alkali as a catalyst. It has also been proposed to prepare synthetic resins by the reaction of cresylic acid and furfural. The cresylic acid used for this purpose was the type produced by high temperature carbonization of American coal and was composed of about two-thirds meta and para cresol, about one-third ortho cresol and possibly a small amount of the higher boiling phenols. Resins produced by the reaction of a cresylic acid containing approximately these proportions of cresols with furfural have not proved entirely satisfactory. The reactions have been slow and uncertain and the potentially infusible resins produced have not been uniform. Products in which they were employed were lacking in strength and, when used for molding purposes, they had a tendency to stick to the molds.

I have made the discovery that if the ortho cresol is separated from the meta and para cresols by distillation, and xylenol substituted in its place, the reaction of the resulting mixture with furfural or one of its homologues, such as methyl furfural, proceeds more rapidly, less time will be required to complete the process, and a more readily controlled and uniform resin which is potentially infusible will be formed. As above stated, I may obtain this product by removing the ortho cresol from a cresylic acid containing this compound, mixed with para and meta cresol and then adding xylenol. I prefer, however, to use a commercial coal tar acid which is available in large quantities at the present time.

This commercial coal tar acid contains about 75% of meta and para cresol, from 20 to 25% of xylenol, a small percentage of high boiling phenols and possibly a small percentage of ortho cresol and other impurities. It remains liquid at a very low temperature, is more reactive and considerably less expensive than meta and para cresol, and is far superior to a cresylic acid containing a mixture of ortho, meta and para cresols. The coal tar acid that I have used for this purpose is imported, the specifications for which state that not more than 2% shall distill below 200° C. and not more than 75% below 215° C.

It will, of course, be understood that for the purpose of my invention, the coal tar acid may vary to some extent in the proportion of its constituents, but to obtain good results, it is essential that a substantial percentage of xylenol be present, say not less than 5%, and that the amount of ortho cresol be low, say not over 2%. Fairly good resins may be produced when the ortho cresol is present in quantities as high as 5%, but they have some of the undesirable qualities found in resins formed from a cresylic acid containing ortho, meta and para cresol. If the percentage of xylenol is high, less time will be required to complete the reaction, while if less xylenol is present, the reaction will proceed at a somewhat slower rate. Any one of a number of bases and alkaline salts, or a mixture of two or more, may be used as a catalyst, such as sodium hydroxide, potassium carbonate, ammonium hydroxide or sodium carbonate. Sodium carbonate is especially suitable as it is less expensive and only a small trace of it remains in the final product.

The following is an illustrative example of carrying out my process. I have found that the ingredients, proportions and temperatures therein stated are well adapted for this purpose and give excellent results, but it will be understood that they may be varied to some extent and will of course depend upon the composition and purity of the coal tar acid. 120 parts by weight of a coal tar acid containing about 75% meta and para cresol and about 20% to 25% of xylenol, 96 parts by weight of furfural and one part by weight of a basic catalyst, such as sodium carbonate, are mixed together. The mixture is boiled under a reflux condenser from three to four hours, preferably with stirring. The excess water and any uncombined furfural and coal tar acid are then distilled off, and a dark reddish-brown resin remains in the reaction vessel. The resin is drawn off while in the molten stage and cooled in shallow pans or it may be run into a solvent which cools and dissolves it simultaneously. The resin is solid at room temperature, fusible and is soluble in acetone, furfural, mixtures of benzol and alcohol and other organic solvents. A satisfactory resin has also been obtained by the reaction of a mixture of formaldehyde and furfural with the coal tar acid containing xylenol. When an aldehydic mixture is used 10% of the weight of the furfural may be replaced by an equal weight of 37% formaldehyde solution. The addition of formaldehyde accelerates the reaction slightly.

By adding a small percentage of a hardening agent, such as paraform, furfuramid or hexamethylenetetramine, the resin is converted into a potentially infusible product capable of being transformed into an infusible state by heat and pressure. The hardening agent may be added in amounts ranging from ½% to 10%. I have found that for an ordinary resin, 5% gives a very satisfactory product.

The resin or gum may be prepared for the market in various forms. It may be employed with the usual fillers such as wood flour, clay, asbestos, talc, etc. for making molding mixtures, or it may be dissolved in a suitable solvent and used as a varnish; for example, if 20 parts by weight of the fusible resin to which 5% of hexamethylenetetramine has been added is dissolved in 50 parts of a solvent containing 75% benzol and 25% alcohol, an excellent varnish for impregnating purposes is obtained. Other organic solvents may be used in preparing the varnish, such as acetone or furfural. While the specific proportions of the resins and solvents have been given above, it will be understood that they may be varied to suit any particular requirements. If sheets of paper treated with the varnish are stacked and molded in a hydraulic press under a pressure of 1000 pounds per square inch and at a temperature of 160° to 180° C. for a period of 35 minutes to 2 hours, depending upon the thickness of the paper, the molded product is strong and substantially infusible and insoluble.

While I have described in detail a preferred form of my invention, changes may be effected therein without departing from the spirit and scope thereof; for instance, furfural-engendering substances may be used instead of furfural, such as pentosans which, when subjected to heat produce furfural, and other compounds of the furane ring type such as the homologues of furfural of which methyl furfural is an example, have also been employed with good results. Other changes will be apparent to those skilled in the art and I, therefore, do not desire to limit my invention, except as defined in the appended claims.

I claim as my invention:

1. A new composition of matter comprising a condensation product of an aldehydic mixture containing furfural and a coal tar acid containing a substantial amount of xylenol, and not more than 5% ortho cresol.

2. A new composition of matter comprising a condensation product of a furane ring type aldehyde and a coal tar acid containing a substantial amount of xylenol, and not more than 5% ortho cresol.

3. A new composition of matter comprising a condensation product of an aldehydic mixture containing furfural and formaldehyde and a coal tar acid containing a substantial amount of xylenol.

4. A new composition of matter comprising a fusible condensation product of furfural and a coal tar acid containing a substantial amount of xylenol, and not more than 5% ortho cresol.

5. A new composition of matter comprising a fusible condensation product resulting from the reaction of furfural and a coal tar acid containing not over 5% ortho cresol and a substantial amount of xylenol in the presence of a condensation agent.

6. A new composition of matter comprising a fusible condensation product resulting from the reaction of furfural and a coal tar acid containing between 5 and 25% of xylenol and not more than 5% ortho cresol in the presence of a condensation agent.

7. A new composition of matter comprising a fusible condensation product of furfural and a coal tar acid containing a substantial amount of xylenol and not more than 5% of ortho cresol and a hardening agent, said composition being convertible by heat into a hard and substantially insoluble and infusible body.

8. A new composition of matter comprising a fusible condensation product resulting from the reaction of furfural and a coal tar acid containing not more than 5% ortho cresol and a substantial amount of xylenol in the presence of a catalyst, and a hardening agent incorporated with the fusible condensation product, said composition being convertible by heat into a hard and substantially insoluble and infusible body.

9. A new composition of matter comprising a fusible condensation product resulting from the reaction of furfural and a coal tar acid containing not more than 5% ortho cresol and a substantial amount of xylenol in the presence of a basic catalyst, and a hardening agent incorporated with said fusible condensation product, said composition being convertible by heat into a hard and substantially insoluble and infusible body.

10. A potentially reactive composition comprising a fusible condensation product of furfural, a coal tar acid containing not more than 5% ortho cresol and a substantial amount of xylenol, and a hardening agent comprising a methylene-containing body, said composition being convertible by heat into a hard and substantially insoluble and infusible body.

11. A potentially reactive composition comprising a fusible condensation product of furfural, a coal tar acid containing not more than 5% ortho cresol and a substantial amount of xylenol, and hexamethylenetetramine, said composition being convertible by heat into a hard and substantially insoluble and infusible body.

12. A potentially ractive composition comprising a fusible condensation product resulting from the reaction of furfural and a coal tar acid containing not more than 5% ortho cresol and a substantial amount of xylenol in the presence of sodium carbonate as a catalyst, and a hardening agent, said composition being convertible by heat into a hard and substantially insoluble and infusible body.

13. A composition comprising a fusible condensation product of furfural and a coal tar acid containing not more than 5% ortho cresol and a substantial amount of xylenol, and a filler.

14. A potentially reactive molding mixture comprising a fusible condensation product of furfural and a coal tar acid containing not more than 5% ortho cresol and a substantial amount of xylenol, a reaction agent for causing the converting of the fusible product into a hard insoluble and infusible product under heat, and a filling material.

15. A new composition of matter comprising a fusible condensation product of furfural and coal tar acid containing not more than 5% ortho cresol, xylenol and a mixture of meta and para cresol.

16. A new composition of matter comprising a fusible condensation product resulting from the reaction of furfural and a coal tar acid containing not more than 5% ortho cresol a major proportion of meta and para cresol and a substantial amount of xylenol.

17. The process which comprises mixing furfural, a coal tar acid containing not more than 5% ortho cresol, a substantial amount of xylenol and a condensation agent in such proportions as to yield, by reaction and upon the elimination of water and any excess coal tar acid or furfural, a condensation product of the fusible soluble type.

18. The process which comprises reacting on an aldehydic mixture containing furfural and formaldehyde with a coal tar acid containing a substantial amount of xylenol to form a fusible soluble condensation product.

19. The process which comprises subjecting a fusible condensation product of a furane type aldehyde and a coal tar acid containing a substantial proportion of xylenol and not more than 5% ortho cresol to the action of heat and pressure in the presence of a hardening agent to transfer the fusible product into a hard, insoluble and substantially infusible body.

20. The process which comprises reacting on furfural with a coal tar acid containing not more than 5% ortho cresol and a substantial amount of xylenol to form a fusible, soluble condensation product and then hardening said product.

21. A new composition of matter comprising a condensation product resulting from the reaction of furfural and a coal-tar acid containing not more than 2% ortho cresol and consisting essentially of xylenol and meta and para cresols.

22. A new composition of matter comprising a condensation product resulting from the reaction of furfural and a coal-tar acid, not more than 2% of which distills below 200° C. and not more than 75% of which distills below 215° C.

23. A new composition of matter comprising a condensation product resulting from the reaction of a furane-ring-type aldehyde and a mixture of phenolic bodies including 5% to 25% of xylenol, and not more than 5% of ortho cresol.

24. A new composition of matter comprising a condensation product resulting from the reaction of furfural and a mixture of phenolic bodies including meta and para cresols and from 5% to 25% of xylenol, and not more than 5% of ortho cresol.

In testimony whereof, I have hereunto subscribed my name this 3rd day of August 1927.

GERALD H. MAINS.